United States Patent [19]

McClung et al.

[11] Patent Number: 4,951,249
[45] Date of Patent: Aug. 21, 1990

[54] METHOD AND APPARATUS FOR CONTROLLED ACCESS TO A COMPUTER SYSTEM

[75] Inventors: Charles R. McClung, Baldwin, N.Y.; Peter H. Roberts, Brooklyn, N.Y.

[73] Assignee: Harcom Security Systems Corp., New York, N.Y.

[21] Appl. No.: 328,735

[22] Filed: Mar. 23, 1989

Related U.S. Application Data

[63] Continuation of Ser. No. 922,600, Oct. 24, 1986, abandoned.

[51] Int. Cl.[5] .................... G06F 12/14; H04L 9/00
[52] U.S. Cl. .................................. 364/900; 380/23; 380/25; 340/825.34
[58] Field of Search ... 364/200 MS File, 900 MS File; 340/825.3, 825.31, 825.34; 380/3, 4, 23, 25, 52

[56] References Cited

U.S. PATENT DOCUMENTS

| | | | |
|---|---|---|---|
| 3,643,219 | 2/1972 | Heimann | 364/200 |
| 3,764,742 | 10/1973 | Abbott et al. | 340/825.3 X |
| 3,806,882 | 4/1974 | Clarke | 364/200 |
| 4,494,114 | 1/1985 | Kaish | 364/900 X |
| 4,532,508 | 7/1985 | Ruell | 340/825.34 |
| 4,549,281 | 10/1985 | Eckert et al. | 364/900 |
| 4,558,175 | 12/1985 | Genest et al. | 380/21 |
| 4,621,334 | 11/1986 | Garcia | 340/825.3 X |
| 4,622,651 | 11/1986 | Eckert | 364/900 |
| 4,667,307 | 5/1987 | Porcher et al. | 364/900 |
| 4,685,055 | 8/1987 | Thomas | 340/825.31 X |
| 4,713,753 | 12/1987 | Boebert et al. | 364/200 |
| 4,757,533 | 7/1988 | Allen et al. | 380/23 X |

Primary Examiner—David L. Clark
Attorney, Agent, or Firm—Schechter, Brucker & Pavane

[57] ABSTRACT

A computer security system protects the computer software from unauthorized access and the computer hardware from unauthorized intrusion. At the start up of the computer system, the computer's keyboard and diskette drive are disabled. The user is required to identify himself through the use of a non-keyboard device such as a magnetic card reader. As a means of further validation, the user enters a PIN via the keyboard which has now been restored to function. A valid user will be allowed access to those programs for which he has been preauthorized. Attempts to gain access to the operating system or to programs for which the user is not authorized will be filtered by the security system to prevent unauthorized access to certain programs or to preclude efforts to thwart the security system. An alarm circuit provides security to the computer hardware.

27 Claims, 8 Drawing Sheets

METHOD AND APPARATUS FOR CONTROLLED ACCESS TO A COMPUTER SYSTEM

This is a continuation of U.S. Application Ser. No. 922,600 filed Oct. 24, 1986, now abandoned.

BACKGROUND OF THE INVENTION

This invention relates to a computer security system which protects the computer software from unauthorized access and protects the computer hardware from unauthorized intrusion or unauthorized removal. In a particular, it pertains to a security system for the "personal" computers now in wide use.

Since their introduction only a few years ago, the number of personal computers in use in corporations and financial institutions has risen dramatically. Many firms have thousands of these computers throughout their organization. In contrast with the high security traditionally afforded computer equipment and data in the past, personal computers are not generally located in high security areas or operated by a relatively small number of highly trained and highly trusted personnel. Personal computers are often left on desks where anyone a operating system boot diskette can access any of the data stored within the computer with the potential for theft of proprietary information and/or the tampering with it. In addition, the location of such computers in unsecured areas and its relatively small physical size leads to theft of the equipment itself. This theft may either be of the entire computer or of valuable parts which are easily concealed so that they may taken past the security guard.

Present security measures have been little more than superficial. Passwords and user identification numbers that are entered via the keyboard are vulnerable to "hackers" and employee laxity in maintaining password secrecy. Because the input is via the keyboard, any person can attempt to guess a user's password by trying different character sequences at random. In addition, users in groups sharing machines often find it convenient to tell others their password in order to facilitate the second individual's access to some function which was intended by management to be available only to the first individual.

The access control programs in general use to not restrict authorized users from gaining access to the operating system from which they can thwart the intended security controls. The signon and menu programs which require the entry of the password before proceeding to load the user's program selection, must be initiated by the user or by the automatic computer start-up procedure. In the former case, the user has access to all of the operating system functions prior to initiating the program requiring the input of the password In the latter case, the signon-menu program can be exited to gain access to the operating system by causing an abnormal program exit such as depressing the control/break keys on many computer systems. Once access to the operating system is obtained, the user can run his programs without the security program in place or possibly change the security program.

Many of the user programs which authorized users of the system may legitimately execute are designed without regard to the control over access to the operating system and provide exits to the operating system themselves. This, too can provide the user access to the operating system and thus the ability to bypass the security program.

It is also possible for a user to insert a diskette into the disk drive found in most computer systems which will enable him to gain access to the operating system and bypass the security functions.

Physical security of the computer system is often provided by wire cable padlocked to the computer and the desk it sits on. However, this presents little deterrent to a professional thief who can easily cut the cables or pick the locks. In addition, if a master key is used for all of the locks to make it easy for authorized personnel to move or repair the equipment, lax handling of this master key can render the use of padlocks and cables worthless. The computer system itself does not have any means to alert security personnel that a theft is in progress, thus allowing the thief to procede without interruption. Furthermore, the cables and locks make it cumbersome for authorized users to move or repair the equipment or make changes in the installed hardware options.

SUMMARY OF THE INVENTION

It is the general object of the present invention to provide a computer security system that protects both the computer hardware and the computer software.

Another object of the invention is to restrict authorized users to a subset of data files and/or programs and computer system functions for which they have been preauthorized.

A further object of the present invention is to allow certain authorized users complete access to all data and all capabilities of the system and to allow them to determine the access for other users of the system.

Yet another object of the invention is to make physical removal of the computer hardware difficult.

A still further object of the present invention comprises a method for securing a computer system having a keyboard and a non-keyboard data entry device. Control of the computer system is transferred to a security program. The operability of the keyboard is disabled. All requests which would place the operation of the computer outside of the security program are filtered. All operators are required to identify themselves via a non keyboard device. The operators identification is validated and operability of the keyboard is restored. Valid users are allowed access only to programs for which they have been preauthorized.

Yet another object of the invention comprises a security device where a computer system having a keyboard and a non-keyboard data entry device. Means transfers control of the computer system to a security program. Means disables operability of the keyboard. Means filters all requests which would place the operation of the computer outside of the control of the computer program. Means identifies all operators via a non-keyboard device. Means validates the operators identification and means restores the operability of the keyboard. Means allows a valid user access only to programs for which the user has been preauthorized.

A still further object comprises an alarm for a computer system enclosed in a housing. Tilt detection means detects a tilting of the computer system. Tamper means detect the loosening or removal of a screw on the housing which would allow access to the inside of the housing. Alarm means is coupled to the tilt detection means and the tamper detection means for sounding an alarm if the computer is tilted or a screw is loosened. Means responsive to a reset instruction from a user authorized to reset the alarm is provided, the reset instruction being generated by the security program resident in the computer system.

BRIEF DESCRIPTION OF THE DRAWINGS

FIG. 6, comprising

DETAILED DESCRIPTION

The present invention is illustrated herein for IBM PC, XT or AT (trademarks of IBM Corporation) computers or computers which are compatible with these computers. The present invention is described in connection with these computers because of their extreme popularity and this should not be taken as an implication that the security system can not be applied to other computer systems. The detailed operation of the internal parts of these computer systems is described in the IBM PC Technical Manual and in the IBM PC Macro Assembler Language Manual and the Intel IAPX 86, 88 User's Manual which are well known to those skilled in the art and which are incorporated herein by reference.

Figure 1:
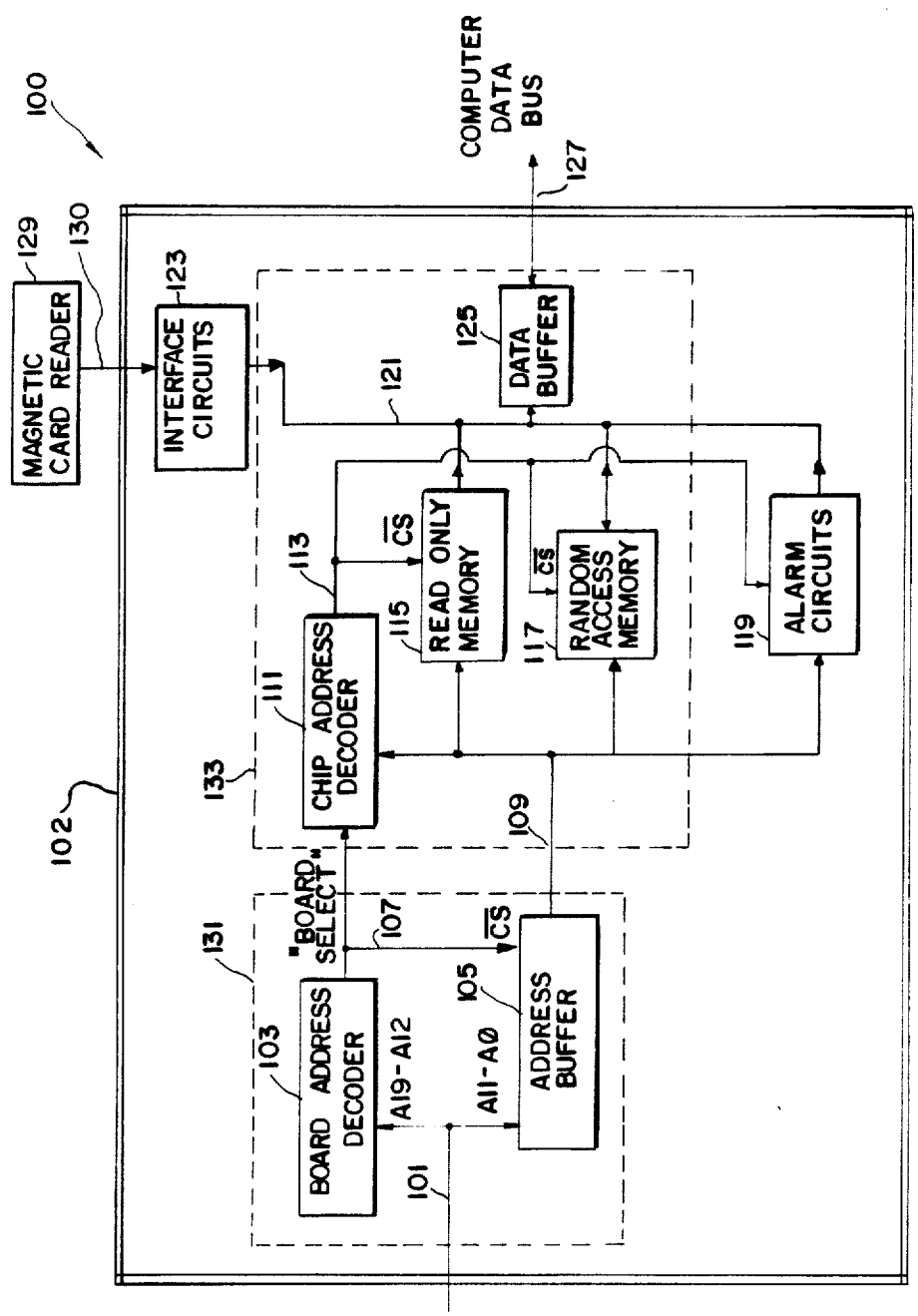
FIG. 1 is an overall block diagram of the computer security system.

Referring to FIG. 1, an overall block diagram of the computer security system in accordance with the present invention is generally shown as 100. The system comprises a printed circuit board 102 which fits into one of the expansion slots in the computer system and a magnetic card reader 129 which is coupled to the printed circuit board via bus 130. The printed circuit board comprises four blocks of circuitry. Block 123 is the interface circuit between the magnetic card reader and the security system which is described in detail in connection with FIG. 6. Block 131 contains a circuit necessary for generating the "board select" (BS) signal and for buffering the lower address lines A11-A0 which is described in detail in connection with FIG. 4. Block 133 contains the circuits necessary for the chip level address decoding circuits and the interface with the computer data bus and is described in greater detail in connection with FIG. 5. Block 119 is an alarm circuit which is described in greater detail in connection with FIG. 8.

In FIG. 1, the computer address bus 101 is coupled to address buffers 105 and board address decoder 103. Buffer 105 buffers the lower order address bits so that the security system circuit board only presents one TTL load to the computer bus drivers. The board address decoder 103 decodes address bits A19-A12 to generate a board select signal and a $\overline{CS}$ signal on bus 107. A board select signal is coupled via bus 107 to chip address decoder 111 and the $\overline{CS}$ signal is coupled via bus 107 to the address buffer 105. The output of address buffer 105 on bus 109 is buffered bits A11-A0 which are coupled via bus 109 to the chip address decoder 111, to a read only memory (ROM) 115, a random access memory (RAM) 117 and to alarm circuit 119. Chip address decoder 111 produces $\overline{CS}$ signals on lines 113. One $\overline{CS}$ signal which is coupled to the ROM, another is coupled to the RAM a third coupled to the alarm circuits. Data bus 121 connects the output of interface circuit 123, the output of ROM 115, the output of alarm circuit 119 and the input/output of data buffer 125 to the input/output of RAM 117. The signals on bus 121 are buffered by data buffer 125 and appear on computer data bus 127 or the signals on computer bus 127 may be buffered by buffer 125 and appear on bus 121.

Figure 2:
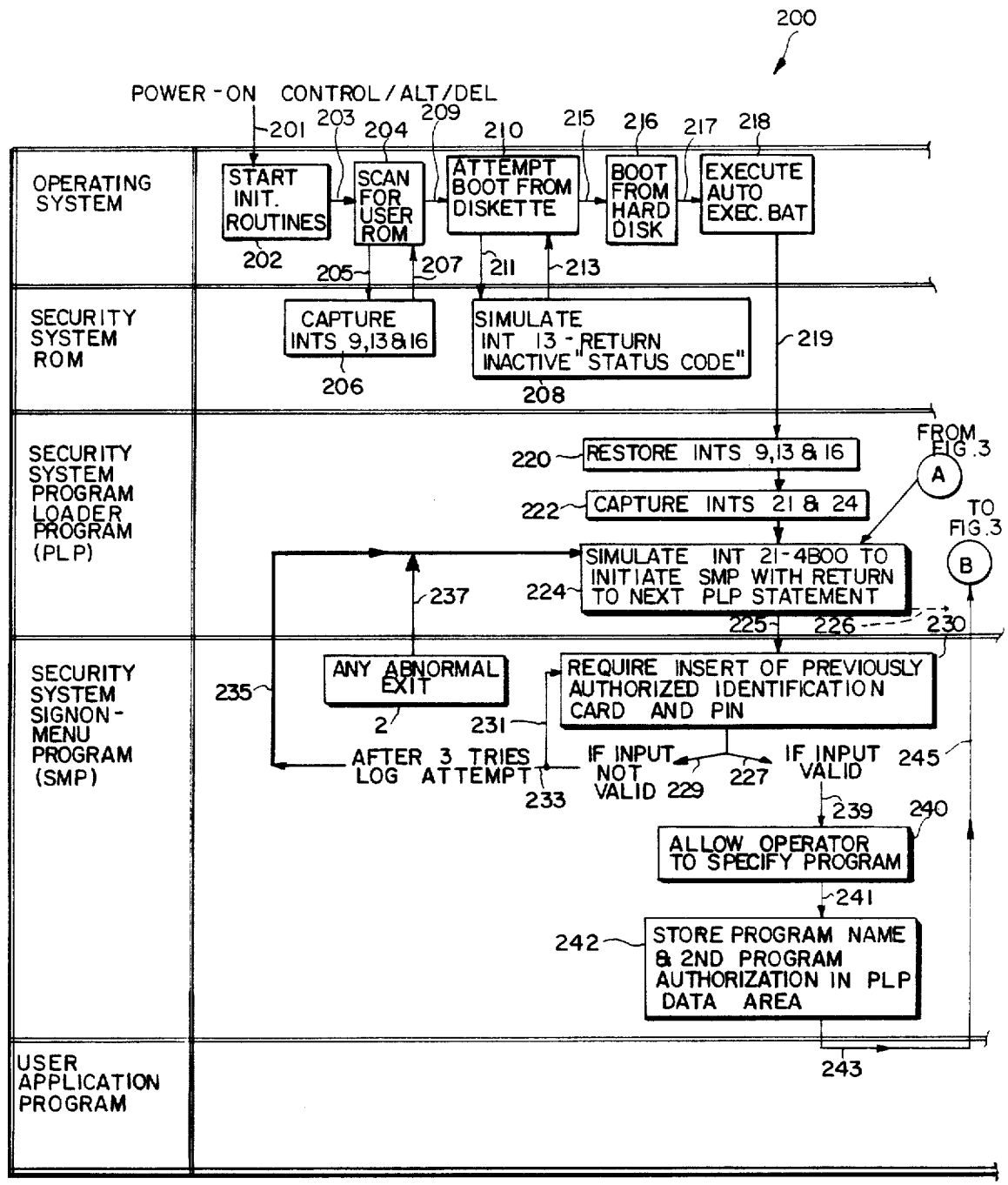
FIGS. 2 and 3 are a flow diagram of the event sequences of the computer security program.
Figure 3:
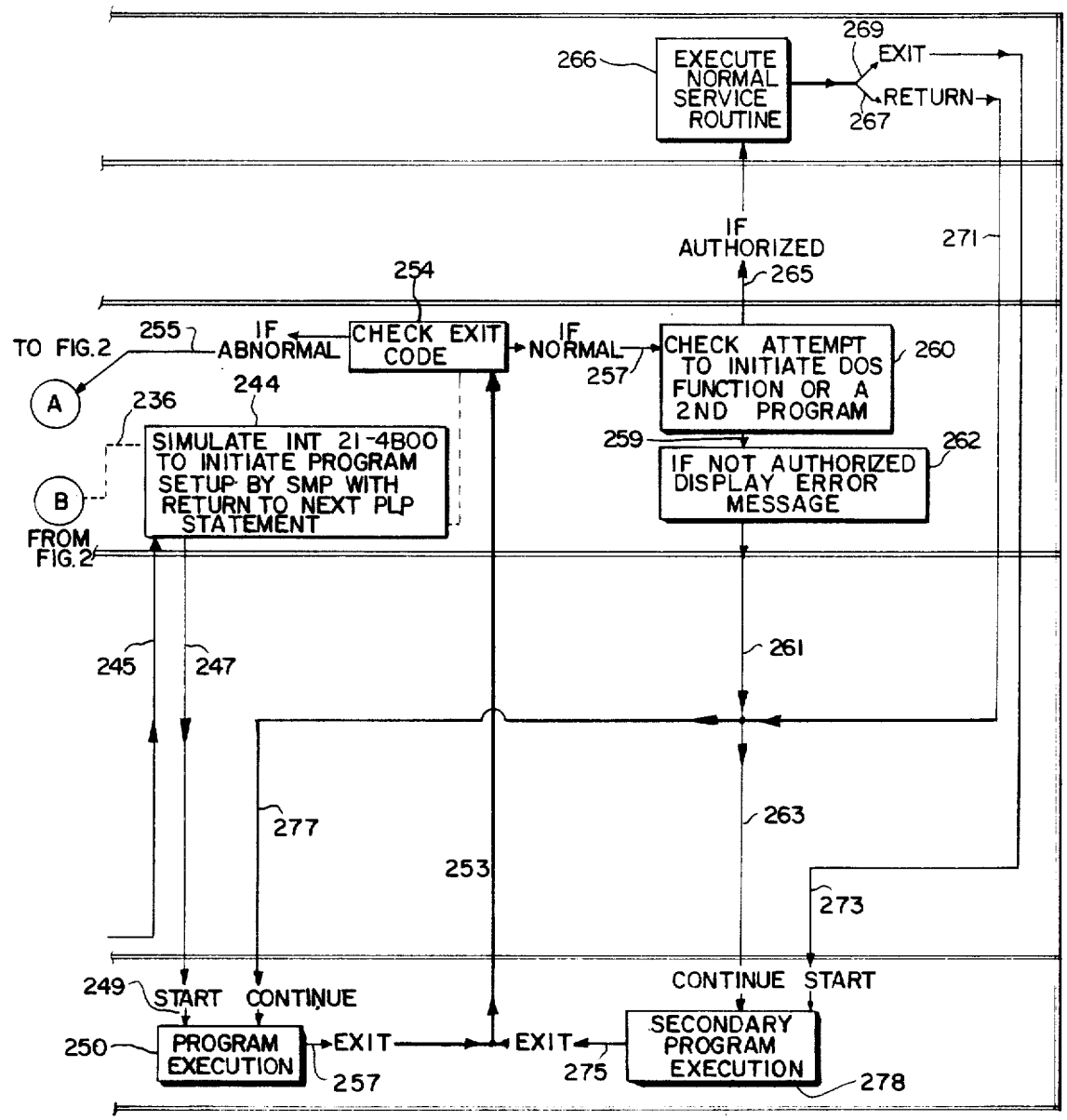

As is well known to those skilled in the art, computer systems operate under the control of an operating system. The most common operating system for "personal" computers is the disk operating system (DOS). In order to avoid the problems of the prior art, it is necessary for the security system to act as an intermediary between the user's application program and the computer operating system. FIGS. 2 and 3 contain a flow diagram of the operation of the computer security system. These figures are divided into five levels. Level 1, shows the functions performed by the operating system such as DOS. For clarity, details of functions performed for programs at other levels are omitted, except where they are critical for the understanding of the operating fundamentals of the present invention. Level 2 shows the functions performed by the security system during the initial start up procedure by instructions stored in a ROM on the security system circuit board. Level 3 shows the security system program loader program (PLP) which loads a signon-menu program (SMP) and all user applications which detects all unauthorized attempts of a user to return to the operating system level. Level 4 shows the SMP which authenticates users and presents them with a list of program options and operating system functions which they have been authorized to execute and passes authorized requests back to the PLP in order to initiate execution. Level 5 shows the execution of user programs and the treatment of exits from those programs.

FIG. 2 shows the start of the flow diagram at the turning on of the computer or the performance of a "soft start" by the simultaneously holding down of the control, alternate and delete keys on many computer systems, as is well known to those skilled in the art. The chart enters the operating system Level 1 via path 201 to a start initiation routine block 202. The computer system is hard wired to transfer program execution to the BOOTSTRAP code contained in the computer system boot ROM. The specific routines utilized in this process are described in the above referenced technical reference manual under the heading of BIOS, which stands for Basic Input and Output System. The initialization routines check the working part of the computer to be sure that it is completely functional before turning control over to the operator. During this process, the control sequence passes via path 203 to block 204 in which the operating system scans for a user ROM. Such ROMs may be installed in the computer system in an area having a hexadecimal address range of from C8000 through F4000. If a ROM is installed in this address range and contains the characters AA55 in the first two bytes of the ROM, the operating system will transfer control of the computer system to the program contained in the user ROM.

In the present invention, the user ROM is installed on the security system circuit board which is plugged into one of the expansion slots in the computer system. Control of the computer system proceeds via path 205 to block 206 which contains instructions which will prevent operator input via the keyboard until the security system is in place between the user and the operating system and which will prevent booting the system from a diskette. The instructions in the ROM saves the addresses of the operating system keyboard and diskette service routines in the RAM which is on the security system circuit board. The above-referenced technical manual and the IBM PC Macro Assembler Language Manual contain a detailed description of the way in which service request routines are handled by an operation system. Basically, the addresses of all service routines are stored in a table in the RAM of the computer. This table is shown in Table 1. The first column of Table 1 shows the interrupt number in hexadecimal notation of the interrupt routine. The second column indicates the address in the computer RAM of the routine which performs the function which is listed in the third column. The interrupt routines of interest for the present invention are the diskette/disk routine at hexadecimal 13 and the keyboard service requests at hexadecimal 9 and 16. The program stored in the ROM changes the addresses shown in column 2 of Table 1 for that routine. In this manner, the computer security system can "capture" these service requests and provide special treatment for them. The program in the ROM replaces the address of these 3 routines with addresses of routines contained in the ROM itself which simulate execution of these routines but do not actually perform them. Once this has been accomplished, the operation of the computer system procedes via path 207 back to block 204, returning control to the operating system.

Control passes via line 209 to block 210 which continues with the initiation routines for the operating system. One of these routines checks the operational status of the diskette drive and attempts to read additional boot code from any diskette in the drive. However, the addresss stored in the interrupt table (Table 1) "captures" the interrupt routine 13 for the diskette drive and transfers it to a routine in the security system ROM via line 211. The program in the ROM at that address will indicate to the operating system that the diskette is not operative and will then return control via line 213 to the operating system at block 210. Control passes via line 215 to block 216 in which the operating system continues the initialization process utilizing the boot code stored on the hard disk of the system.

TABLE 1

| SOFTWARE INTERRUPT LISTING | | |
|---|---|---|
| INT # | ADDRESS IN RAM | FUNCTION PERFORMED |
| 0 | 0-3 | Divide by zero |
| 1 | 4-7 | Single step |
| 2 | 8-B | Nonmaskable |
| 3 | C-F | Breakpoint |
| 4 | 10-13 | Overflow |
| 5 | 14-17 | Print Screen |
| 6 | 18-1B | Reserved |
| 7 | 1D-1F | Reserved |
| 8 | 20-23 | Time of Day |
| 9 | 24-27 | Keyboard |
| A | 28-2B | Reserved |
| B | 2C-2F | Communications |
| C | 30-33 | Communications |
| D | 34-37 | Disk |
| E | 38-3B | Diskette |
| F | 3C-3F | Printer |
| 10 | 40-43 | Video |
| 11 | 44-47 | Equipment Check |
| 12 | 48-4B | Memory |
| 13 | 4C-4F | Diskette/Disk |
| 14 | 50-53 | Communications |

TABLE 1-continued

| SOFTWARE INTERRUPT LISTING | | |
|---|---|---|
| INT # | ADDRESS IN RAM | FUNCTION PERFORMED |
| 15 | 54-57 | Cassette |
| 16 | 58-5B | Keyboard |
| 17 | 5C-5F | Printer |
| 18 | 60-63 | Resident BASIC |
| 19 | 64-67 | Bootstrap |
| 1A | 68-6B | Time of Day |
| 1B | 6C-6F | Keyboard Break |
| 1C | 70-73 | Timer Tick |
| 1D | 74-77 | Video Initialization |
| 1E | 78-7B | Diskette Parameters |
| 1F | 7C-7F | Video Graphics Chars. |
| 20 | 80-83 | DOS PGM Term. |
| 21 | 84-87 | DOS FN Call |
| 22 | 88-8B | DOS Term. Address |
| 23 | 8C-8F | Ctl/break Address |
| 24 | 90-93 | DOS Fatal Error |
| 25 | 94-97 | Abs Disk Read |
| 26 | 98-9B | Abs Disk Write |
| 27 | 9C-9F | DOS Terminate |
| 28-3F | A0-FF | Reserved |
| 40-5F | 100-17F | Reserved |
| 60-67 | 180-19F | User INTs |
| 68-7F | 1A0-1FF | Not Used |
| 80-F0 | 200-3C3 | Basic |
| F1-FF | 3C4-3FF | Not Used |

The hard disk is operative and the system will look for a file known to the operating system as the AUTOEXEC.BAT file which contains a user defined sequence of programs and procedures to be executed before giving control over to the operator of the computer system. The operating system executes the AUTOEXEC.BAT file in block 218. The PLP program must be the last program named in the AUTOEXEC.BAT file.

The operation of the computer system passes via line 219 to block 220. In block 220, when the PLP begins execution, it restores the normal diskette and keyboard interrupt addresses thus allowing normal operation of these two devices. Control then passes via line 221 to block 222. In block 222, the PLP saves and replaces the addresses for the critical error routines (interrupt 24) and the DOS function call routine (interrupt 21) and substitutes addresses routing the calls to routines in the PLP itself. Thus, these two routines from Table 1 have been "captured" and other routines are substituted therefore.

Control passes via line 223 to block 224 in which the PLP intiates execution of the SMP by returning control to the operating system with pointers equal to the PLP data area to be used by the SMP to transfer the name of the programs to be loaded by the PLP as the result of user input to the SMP. As described in the description of interrupt 4B in the above referenced technical manual, the pointers for this function are loaded into registers ES:BX. The execution of the SMP via the interrupt 21 4B instruction to the operating system will cause the operating system to return control to the subsequent statements in the PLP when the SMP program terminates. This is indicated by the dotted line 226 in FIG. 2 which goes to point B in FIG. 3.

The SMP saves the address of the PLP data area received in its program prefix segment. This is the result of the interrupt 21 4B call by the PLP as described in the above referenced technical manual in the description of the DOS control blocks and work areas. Control passes via line 225 to block 230 in which the SMP displays a prompt to the user to insert and withdraw his magnetically encoded identification card. The SMP then checks the data read from the card. The card reader interface hardware and the software routine necessary to read the data from the card are explained in fuller detail below in connection with FIGS. 6 and 7. The information on the card is checked against the entries in the security system file of authorized users. If the card is not an authorized card, that is the security system does not have this card stored in its file of authorized users, control passes via line 229 and then via line 231 back to block 230. Setting up the file of authorized users is handled in the same manner as any other application program.

If the card does match one of the previously authorized cards in the security system file, the SMP then requests the user to input his personal identification number (PIN) via the keyboard. The purpose of the PIN is to guarantee that the user of the card is its owner. Magnetically encoded identification cards can be lost or otherwise used by persons that are not their owner. The secret PIN which is known only to the owner and to those authorized to enter such information into the computer's file, greatly reduces a chance of unauthorized entry or entry into portions of the computer for which the user is not authorized. If the PIN entered by the user does not match the one stored with the card identification number in the file of authorized users, control will pass via line 229 and line 231 back to block 230. If, after two more tries, the user does not enter the correct PIN, control will pass via 229 and line 233 to passes via line 235 back to block 224 which restarts the SMP. If the PIN is correct, control will pass via line 227 and line 239 to block 240. In block 240, the SMP will display a list of programs and functions preauthorized by the manager of the security system for this particular user and allow the user to select one of these functions to be executed by the system. If the user selects one of these programs of functions, control passes via line 241 to block 242 in which the name of the program is stored by the SMP in the data area of the PLP using the destination address received by the SMP when it was initiated. At this time, the SMP will also store in this area a code indicating to the PLP whether or not the user has been authorized to initiate DOS tasks and/or second level programs.

In normal exit from the SMP will cause control to pass along lines 243 and 245 to point B in FIG. 3. This causes the operating system to return control to the instruction in the PLP which immediately follows the one which initiated executed of the SMP. Any abnormal exit from the SMP will be directed to PLP routine for interrupt 24 at block 236 which will cause control to pass via lines 237 and 235 to block 234 and cause the SMP to be reinitiated.

Referring now to FIG. 3, the flow diagram 200 for the security system program is continued. Line 226 enters FIG. 3 at point B and continues to block 244. At block 244, the PLP initiates the execution of the program requested by the user by jumping to the interrupt 21 routine in the BIOS with the AX register set to hexadecimal 4B00 and with the pointers to the program name in a stated area set up by the SMP. Control passes via line 247 to the start input 249 to block 250 in which the program is executed. The user program will execute normally as if the security system were not present. Any exit from the user program will pass control via exit line 251 and hence via line 253 to block 254. In block 254, the statement in the PLP that immediately follows the statement initiating the user program analyzes the exit vector set by the user program. If the exit is the result of a fatal error or the user depressing the control/break keys, control passes via line 255 to point A in FIG. 2 at which the PLP reinitiates the SMP. If the exit is a normal request, control passes via line 257 to block 260 where a check is made to see if there is an attempt to initiate a DOS function or a second program. The PLP will check the authority indicator by the SMP at block 242 (FIG. 2). If the user is authorized, the PLP will pass control to the operating system via line 265 to block 266. In block 266, the operating system will perform the requested function and return control back to the user application program via line 271 or line 273 depending on the type of service requested. A return passes control via line 267 to line 271 and hence to line 263 through the continue input of the secondary program execution block 278. An exit via line 269 passes control via line 273 to the start input of the secondary program execution at block 278. The secondary programs execute in the same manner as the initial program requested by the user. Exits from the secondary program pass via line 275 to line 253 back to block 254 and are handled identically to exits from the primary program.

Figure 4:
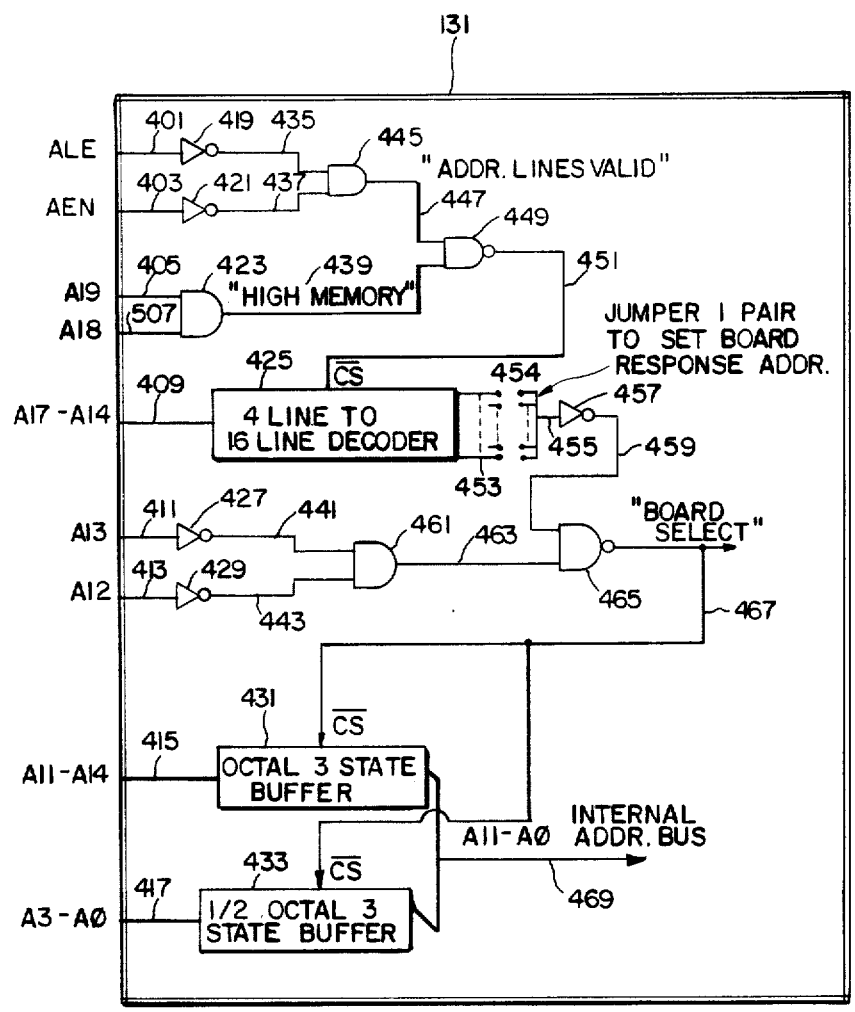
FIG. 4 is a schematic diagram of the board address decoder and buffer circuits shown in FIG. 1.

Referring now to FIG. 4, the board address decoder and buffer circuits 131 shown as FIG. 1 are shown in greater detail. The purpose of the circuit shown in FIG. 4 is to detect that the computer is addressing the computer security system circuit and to buffer the address lines from the address lines of the computer bus so that they can be utilized in other circuits on the circuit board without loading the computer bus. The address latch enable (ALE) signal from the computer address bus is utilized to latch addresses onto the bus at the falling edge of this signal. The address enable (AEN) signal is low when the address lines have been driven from program instructions and high when direct memory access (DMA) transfers are active. Consequently, when the ALE and AEN lines are in the low state the address lines are valid and are being driven by program instructions. The ALE signal is provided to inverter 419 via line 401 and the AEN signal is provided to inverter 421 via line 403. The outputs of these inverters on lines 475 and 437, respectfully, are input to a two input AND gate 445. The result of ANDing these two signals on line 447 is a signal which when high indicates that the address lines are valid. This signal is applied to one input of two input NAND gate 449.

The security system circuit board is designed to respond only to addresses in the range of hexadecimal C8000 through F4000 which is the user ROM area of the computer address space. Table 2 indicates the bit patterns for the circuit board general address. As indicated in the Table, lines A19 and A18 must always be high for the user ROM area to be addressed. Line A19 is applied to input of AND gate 423 via line 405 and line A18 is applied to the other input of AND gate 423 via line 407. A high output on line 439, labeled "high memory" indicates that both of the input lines A19 and A18 are high and that the user ROM is to be addressed. The signal on line 447 and the signal on line 439 are applied to the inputs of two input NAND gate 449. If both signals are high, a low signal appears on line 451 which serves as the chip select ($\overline{CS}$) signal which is active low. This signal serves to enable a four line to sixteen line decoder 425, such as a Texas Instruments 74154, which generates sixteen outputs each which is low for one and only one of the sixteen different bit patterns applied to its four inputs. These inputs are address lines A17 through A14. Table 2 indicates the bit values for the possible combinations of address lines A14 through A17 on bus 409 which is decoded by decoder 425. One of the sixteen outputs of the decoder are chosen to limit the board's response to that particular address simply by placing a jumper 454 between that output 453 and the input 455 to inverter 457. Inverter 457 inverts the active low signal at the output of decoder 425 selected by the placement of jumper 455 to generate an active high signal on line 459.

dress range of the security system circuit board The board address range spans a total of 4K bytes. The lower 2K bytes is devoted to the ROM integrated circuit 527. All but the last 16 bytes of the top 2K bytes is devoted to the RAM integrated circuit 529. The last 16 bytes of the top 2K bytes is used to address the card reader data and to control the alarm arm and disarm circuits. The bit patterns which divide the address range and which define the requirements for the circuits developing the chip select signals are indicated in Table 3.

TABLE 2

| | GENERAL BOARD ADDRESS OPTIONS | | | | | | | |
|---|---|---|---|---|---|---|---|---|
| | A19 | A18 | A17 | A16 | A15 | A14 | A13 | A12 | JUMPER |
| C8 | 1 | 1 | 0 | 0 | 1 | 0 | 0 | 0 | 1 |
| CA | Not Used | | | | | | | | |
| D0 | 1 | 1 | 0 | 1 | 0 | 0 | 0 | 0 | 2 |
| D4 | 1 | 1 | 0 | 1 | 0 | 1 | 0 | 0 | 3 |
| D8 | 1 | 1 | 0 | 1 | 1 | 0 | 0 | 0 | 4 |
| DA | Not Used | | | | | | | | |
| E0 | 1 | 1 | 1 | 0 | 0 | 0 | 0 | 0 | 5 |
| E4 | 1 | 1 | 1 | 0 | 0 | 1 | 0 | 0 | 6 |
| E8 | 1 | 1 | 1 | 0 | 1 | 0 | 0 | 0 | 7 |
| EA | Not Used | | | | | | | | |
| F0 | 1 | 1 | 1 | 1 | 0 | 0 | 0 | 0 | 8 |
| F4 | 1 | 1 | 1 | 1 | 0 | 1 | 0 | 0 | 9 |

As also shown in Table 2, these addresses require that lines A12 and A13 be simultaneously low. Line A13 is applied to the input 411 to inverter 427, the output of which is applied by line 441 to one input of two input AND gate 461. Similarly, line A12 applied to the input 413 of inverter 429, the output of which is applied via line 443 to the other input of AND gate 461. If lines A12 and A13 are both low, high signals will be applied on lines 441 and 443 which will result in a high signal being applied on line 463 to one input of two input NAND gate 465. The signal on line 459 is applied to the other input of NAND gate 465. If the signal on line 463 is high and the signal on line 459 is high, this indicates a valid address has been selected and an active low signal on line 467 labeled "board select" it is generated by gate 465. This signal has two functions. First of all it acts as an active low chip select signal for the one way buffers 431 and 433 for address lines A11 through A4 applied via bus 415 and A3 through A0 applied via bus 417, respectively. In addition, this signal operates as the chip select for the two way three-state octal buffers 581 in FIG. 5, which will be described below. The internal address bus 469 containing buffer address lines A11-A0 corresponds to bus 109 in FIG. 1.

Figure 5:
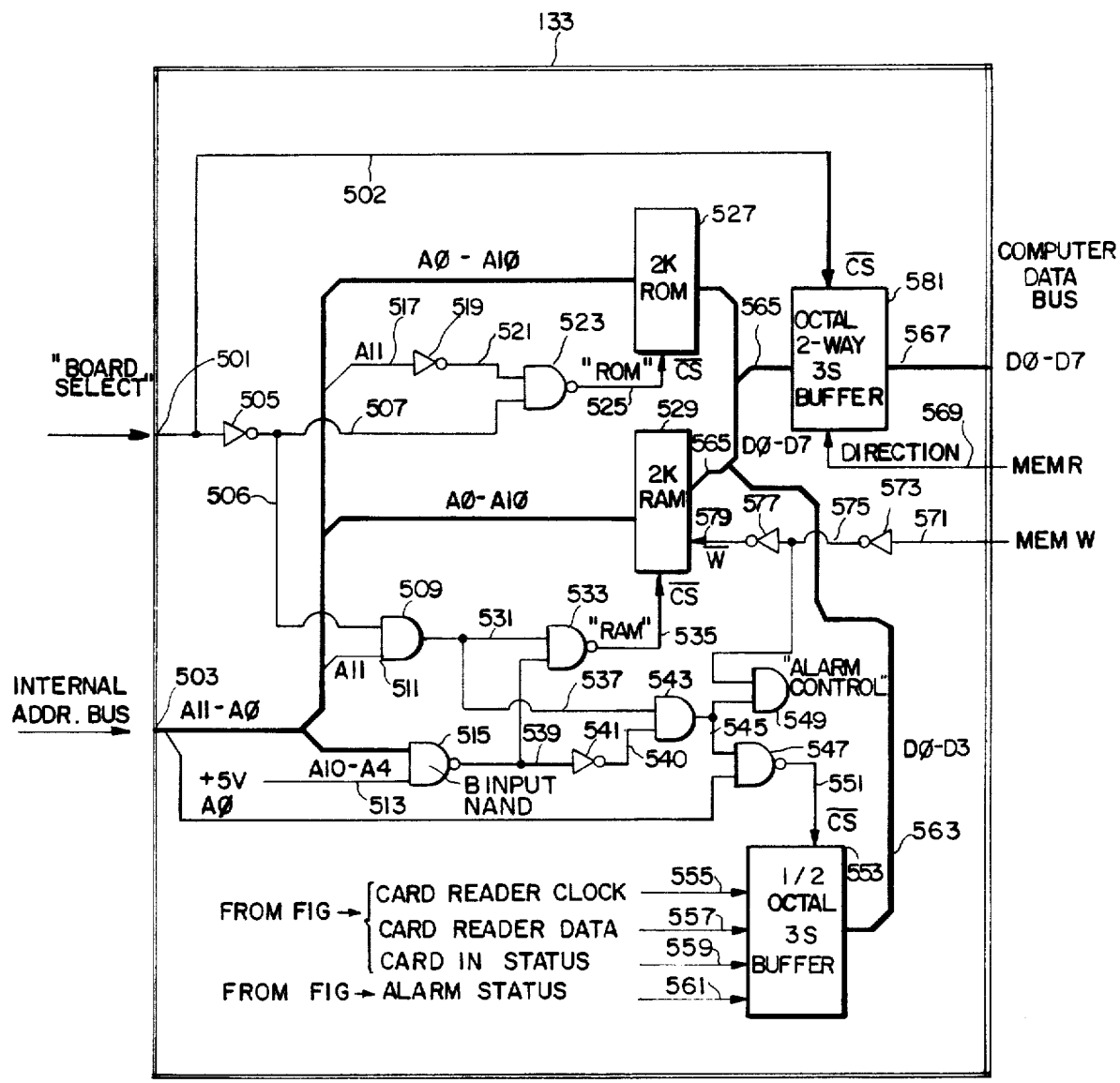
FIG. 5 is a schematic diagram of the chip select decoder and data buffering circuits shown in FIG. 1.

Referring now to FIG. 5, the circuit block 133 shown in FIG. 1 is shown in greater detail. These circuits are utilized to decode the address lines and develop the chip select signals for the ROM and RAM, the card reader and the alarm devices and to buffer the data lines interfacing the security system circuit board with the computer data bus. Before describing the circuit shown in FIG. 5, it will be helpful to describe the use of the ad- The active low board select signal generated on line 467 on FIG. 4 is applied to line 501 in FIG. 5. This signal is inverted by inverter 505 and applied via line 507 to one input of two input NAND gate 523. The internal address bus 469 of FIG. 4 continues as bus 503 in FIG. 5. Line A11 is applied via line 517 through inverter 519 and then via line 521 to the other input of gate 523. Thus, whenever the board is selected and the signal on line A11 is low, the output of gate 523 will be a low on line 525 which will provide an active low chip select signal to the ROM 527 which will be selected. Referring to Table 3 this will occur whenever the board is addressed and the address on line A0–A11 are in the range from hexadecimal 000 through hexadecimal 7FF As can be seen from line 2 of Table 3, line A11 does not become a digital 1 until address hexadecimal 800 is reached. Therefore, all addresses below this address are directed to the ROM.

TABLE 3

| | CHIP SELECT AND ALARM FUNCTION DECODE | | | | | | | | | | | |
|---|---|---|---|---|---|---|---|---|---|---|---|---|
| | A11 | A10 | A09 | A08 | A07 | A06 | A05 | A04 | A03 | A02 | A01 | A00 | |
| 000 | 0 | 0 | 0 | 0 | 0 | 0 | 0 | 0 | 0 | 0 | 0 | 0 | ROM |
| 7FF | 0 | 1 | 1 | 1 | 1 | 1 | 1 | 1 | 1 | 1 | 1 | 1 | ROM |
| 800 | 1 | 0 | 0 | 0 | 0 | 0 | 0 | 0 | 0 | 0 | 0 | 0 | RAM |
| FE0 | 1 | 1 | 1 | 1 | 1 | 1 | 1 | 0 | 1 | 1 | 1 | 1 | RAM |
| FF0 | 1 | 1 | 1 | 1 | 1 | 1 | 1 | 1 | 0 | 0 | 0 | 0 | Not Used |
| FF1 | 1 | 1 | 1 | 1 | 1 | 1 | 1 | 1 | 0 | 0 | 0 | 1 | Read Card Dat |
| FF2 | 1 | 1 | 1 | 1 | 1 | 1 | 1 | 1 | 0 | 0 | 1 | 0 | Disarm Alarm |
| FF4 | 1 | 1 | 1 | 1 | 1 | 1 | 1 | 1 | 0 | 1 | 0 | 0 | Arm Alarm |

The inverted board select signal at the output of inverter 505 is applied via line 506 to one input of two input AND gate 509. The other input to gate 509, 503. The output on line 531 will be high whenever the active low board select is low and line A11 is high. As discussed above, line A11 will be high with addresses starting at hexadecimal 800. The signal on line 531 is applied to one input of two input NAND gate 533. The seven lines A10 through A4 of internal data bus 503 are applied to seven of the eight inputs of eight input NAND gate 515. The other input is tied to the positive logic level of plus 5 volts via line 513. As long as all of these lines A10 through A4 are not simultaneously high, the output of gate 515 on line 539 will be high. This output is applied to the other input of two input NAND gate 533. In this way, the signal on line 539 will be high as long as the address on lines A10 through A4 do not reach hexadecimal FF. This will therefore produce an active low signal on line 535 to select the RAM when the addresses on lines A10 through A4 are in the range of hexadecimal 800 through FE0.

Referring again to Table 3, it can be seen that the alarm set, reset, and card read functions require that all lines in the range A11 through A4 be high simultaneously. This condition is detected by inverting the output of eight input NAND gate 515 via inverter 541 having an input connected to line 539. The output of inverter 541 is coupled via line 540 to one input of two input AND gate 543. The other input to gate 543 is the output of gate 509 on line 531 coupled to gate 543 by line 537. The signal on line 531 is high when both board select signal is active and line A11 is high. The signal on line 540 will be high when all of the lines A10 through A4 are high. These two signals are combined by AND gate 543 to yield a high signal on line 545 whenever both signals at the input of gate 543 are high.

In view of the fact that the address lines from the computer are in a undefined state during the power on operation, it is possible for them to inadvertently disarm the alarm circuits. In order to avoid this possibility, the signal on line 545 is ANDed with the inverted MEMW signal on line 571. This requires that the MEMW line be low, indicating writing to the address, in addition to having a high signal on line 545 to produce the alarm control signal at the output of gate 549. This signal is used to gate the arm and disarm alarm signals into the alarm circuits, as will be described hereinbelow with reference to FIG. 8. In addition, the signal on line 545 is applied to one input of two input NAND gate 547. The other input to gate 547 is line A0 of internal data buss 503. When both of these lines are high, an active low signal will appear on line 551 and act as the chip select to enable the card reader and alarm status signal buffer 553. The signals on lines 555 through 561 will be described in more detail below in connection with FIGS. 6 and 8.

All data read from and written to the circuit board are buffered from the computer data bus 567 by an octal data tranceiver 581 having three state outputs. The outputs of the tranceiver 581 are placed on the computer data bus whenever the board select signal is active low via a $\overline{CS}$ signal on line 502. The direction of the tranceiver signals is controlled by the computer MEMR signal on line 569 which is low for a memory read cycle and high otherwise. The inputs to the tranceiver are from the data lines of the ROM integrated circuit 527, the data lines from the RAM integrated circuit 529, the card reader via lines 555, 557 and 559 and the alarm status signal via line 561. Lines 555 through 561 are buffered by buffer 553.

The ROM and RAM integrated circuits have three state outputs and can therefore be bussed in common to the board side of the data tranceiver. The direction of the RAM data lines is controlled by the MEMW line 571 and is low for a memory write cycle and high otherwise. This line is buffered by two inverters 553 and 557 in series to avoid more then a single TTL load on the computer line driver. The card reader and alarm status signals are not three state and must therefore be buffered before placing them on the internal data bus 503. This is accomplished by utilizing one half of an octal three state buffer 553.

Figure 6A:
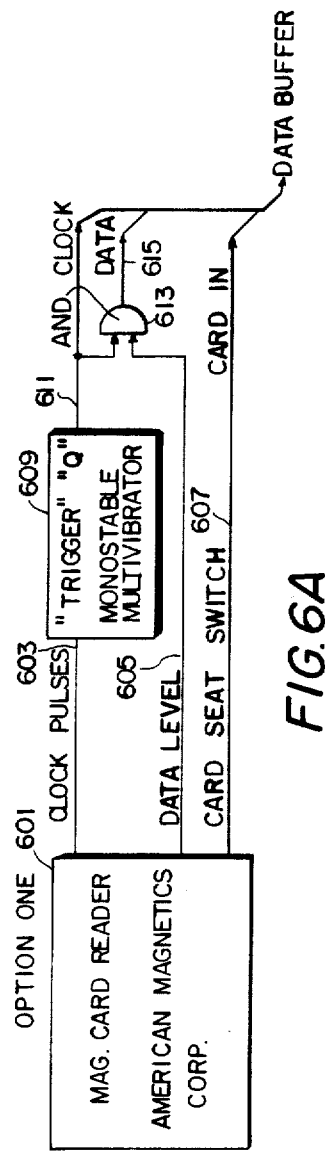
FIGS. 6A and 6B, is a block diagram of the magnetic card reader interface circuits.
Figure 6B:
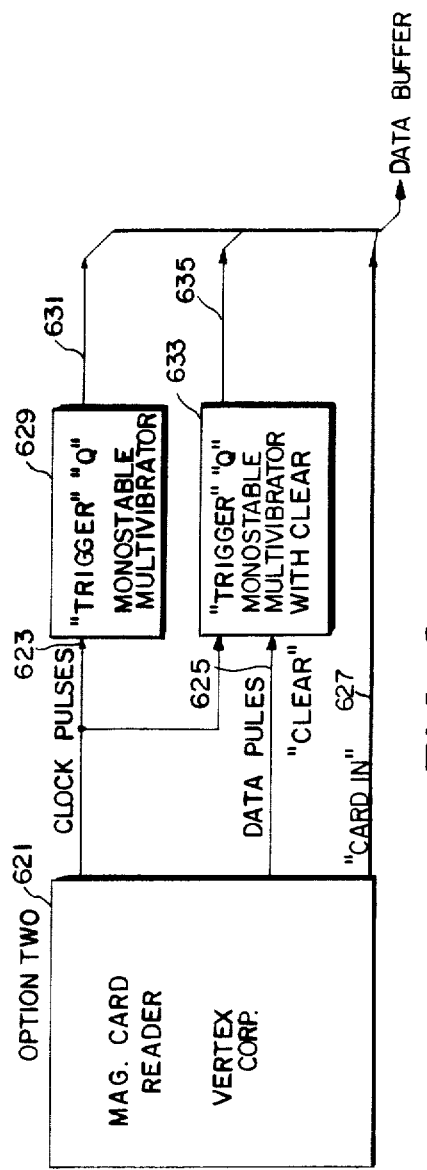

Referring now to FIG. 6, the interface circuits for two commercially available magnetic card readers are shown. FIG. 6A shows the interface circuit for a reader made by American Magnetics Corporation and FIG. 6B shows the interface for a card reader made by Vertex Corporation. Both readers conform to American National Standard X4.16-1976, which is incorporated herein by reference. The purpose of the interface circuit is to convert the output of the commercially available magnetic card readers to a common format for the computer security system software. Both of the commercially available units illustrated in FIG. 6 provide "data true" output signals on the rising edge of a clock pulse derived from the flux transitions inbedded in the magnetic stripe on the card. The system software looks for the positive clock pulses (data bit 0 at address BS:0FF1). The clock pulses from the card reader circuit last only a few microseconds so they must be "stretched" to approximately 500 microseconds in order to ensure that the software will detect them. The software will be described below in greater detail in connection with FIG. 7.

FIG. 6A shows the interface hardware for an American Magnetics Corporation magnetic card reader. The clock pulses provided on line 603 are applied to the trigger input of a monostable multivibrator 609. The "Q" output on line 611 is applied to the clock line output which goes to the data buffer. This line corresponds to line 555 in FIG. 5. The data level signal on line 605 is applied to one input of two input AND gate 613. The other input of this gate is tied to line 611. The output of this gate is the data line 615 which is applied to the data buffer. This line corresponds to line 557 in FIG. 5. The card "seat switch" is connected via line 607 to the card in status line which is applied to the data buffer. This line corresponds to line 559 in FIG. 5. The monostable multivibrator 609 stretches the clock pulses in a manner well known to those skilled in the art.

The circuit of FIG. 6B is very similar to the circuit of FIG. 6A except that the data true signal from the Vertex card reader lasts only a few microseconds and therefore must also be stretched. A second monostable multivibrator 633 is triggered by the clock pulses on line 623. The data pulses on line 625 are applied to the "clear" input to the monostable multivibrator which only allows the circuit to change states to a high signal at the "Q" output when the signal on line 625 is high. The "Q" output of the first monostable multivibrator 629 is triggered by the clock pulses on line 623 to provide the stretched clock pulses on line 631. The stretched data pulses are provided on line 635 and the card in status signal is provided on line 627. These lines correspond to lines 555, 557 and 559, respectively, of FIG. 5.

The card reader shown in both FIGS. 6A and 6B provide a signal indicating that the card has been inserted and a transition in that signal indicates that a withdrawal of the card has begun. This indicates that the clock and data signals will represent valid information from the card. This "card in" signal is provided on line 607 in FIG. 6A and line 627 in FIG. 6B and correponds to line 559 in FIG. 5.

Figure 7:
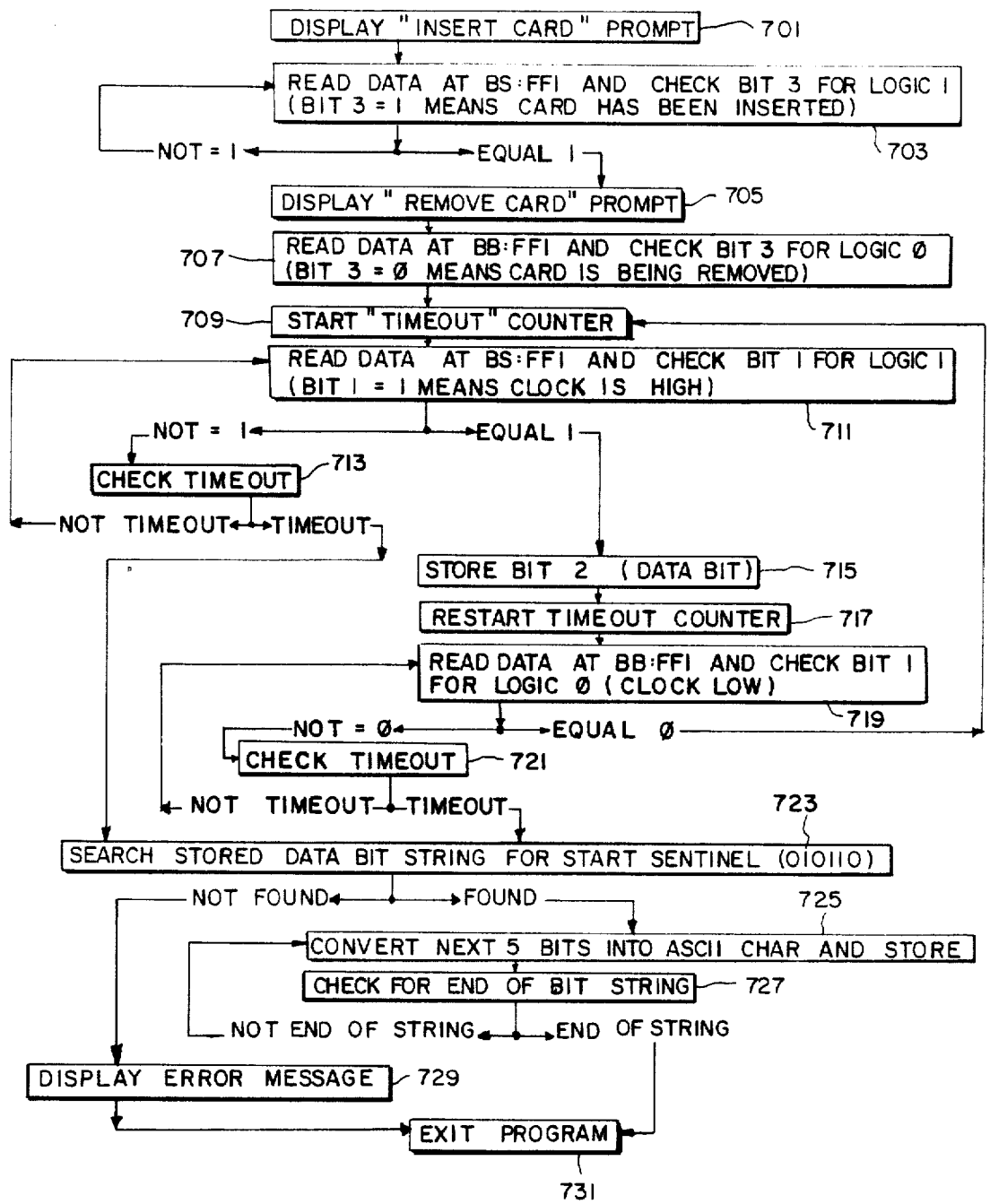
FIG. 7 is a flow diagram of the magnetic card reader program.

FIG. 7 shows a flow diagram for the program used by the computer to process the bit stream from the card reader. At block 701, the computer displays the prompt for the user to insert his card. Control passes to block 703 where the data at location BS:FF1 is read and bit 3 is checked for a logic 1 which means that the card has been inserted. If bit 3 does not equal a logic 1, the cycle is repeated until it does equal a logic 1. If bit 3 does equal a logic 1, control passes to block 705 where the computer displays a prompt for the user to remove his card. Control then passes to block 707 where the data at BS:FF1 is read and bit 3 is checked for a logic 0 which means that the card is being removed. Control then passes to block 709 in which a "timeout" counter is started. Control passes to block 711 in which the data at BS:FF1 is read and bit 1 is checked for a logic 1 which means that the clock signal is high. If the clock signal is not high, (bit 1 is not a logic 1) control passes to block 713 in which the timeout timer is checked. If the predetermined period of time has not elapsed control passes back to block 711 and the process is repeated. If the predetermine period of time has elapsed control passes to block 723. If the clock is high (bit 1 equals a logic 1) control passes to block 715 and bit 2 (the data bit) is stored. Control then passes to block 717 in which the timeout counter is restarted after which control is passed to block 719. In block 719 the data at BS:FF1 is read and bit 1 is checked for logic 0 which means the clock is low. If bit 1 is equal to a logic 0, control passes back to block 709 and this portion of the process is repeated. If bit 1 is not a logic 0, control passes to block 721 which checks the timeout counter. If the amount of time allowed for this operation has not occurred, control will pass via the "not timeout" branch back to block 719 and the process will be repeated. If the amount of time has elapsed control will pass to block 723.

In block 723, the program searches for the data bit stream stored in the random access memory for the start sentinal bit which contains the bit pattern 01011. If that bit pattern is not found, control passes to block 729 and an error message is displayed and the program passes to its exit at block 731. If the start sentinal is found, control passes to block 725 and the next five bits are converted into ASCII code using a binary coded decimal four bit character configuration shown in Table 1 of the above-referenced American National Standard. The program continues in this loop until the end of the bit stream is reached at which time the program exits at block 731. The resulting ASCII stream is used as a key to the authorization file stored on the disk to determine if the person placing the card through the reader is an authorized user of the system.

Figure 8:
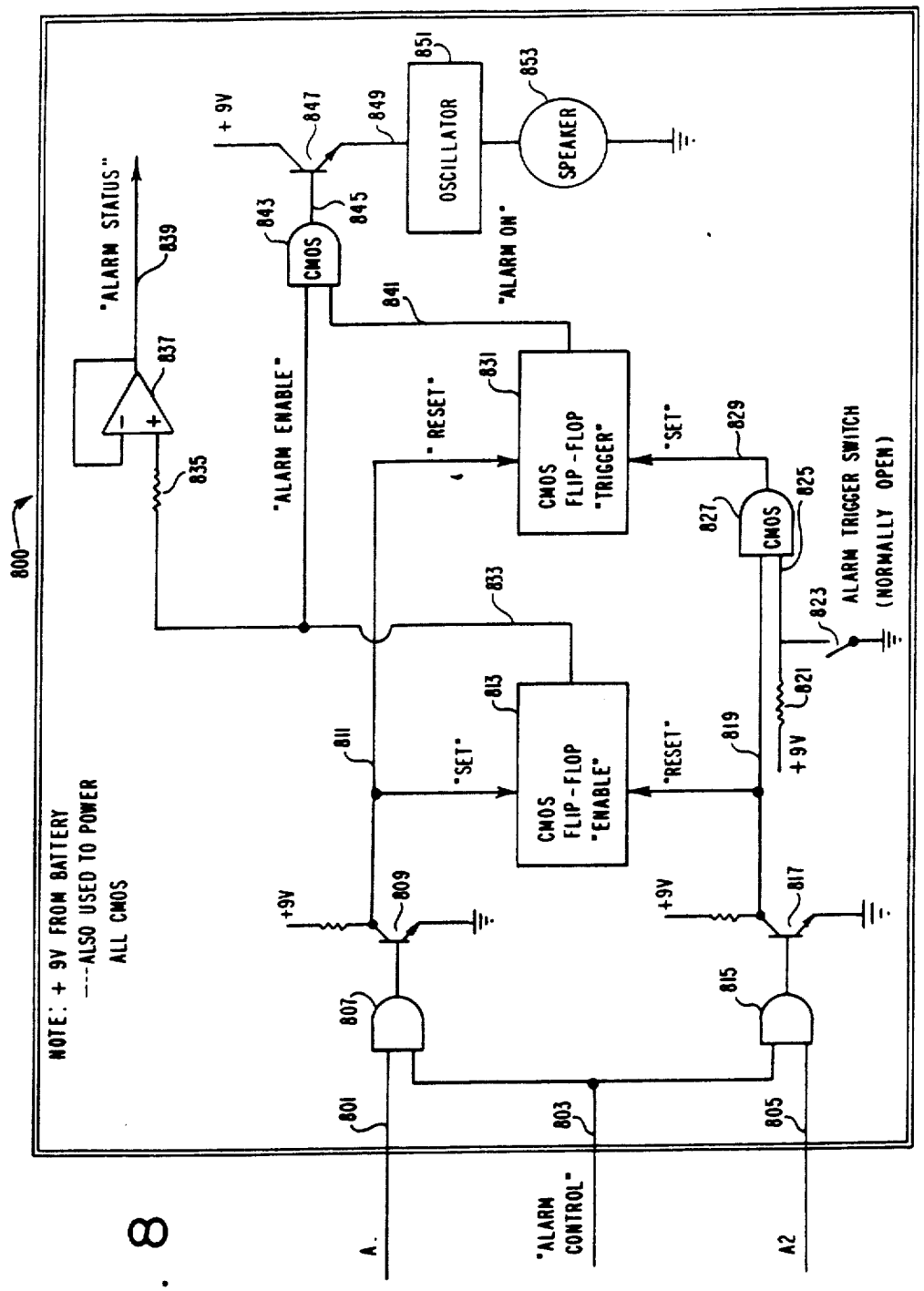
FIG. 8 is a schematic diagram of the alarm circuit.

Referring to FIG. 8, the alarm circuit for the computer security system is generally shown as 800. This circuit utilizes CMOS integrated circuits to provide a low quiessent current drain because the entire alarm circuit is powered by a nine volt DC battery. The audio alarm 853 is a commercially available buzzer driven by oscillator 851 which is powered by the same nine volt battery. The alarm is activated by switching transistor 847 which is controlled by AND gate 843 which has a nine volt output whenever the "alarm enable" signal 833 and the "alarm on" signal 841 are both in the logic 1 state.

The alarm system is armed by software instructions in the menu program which addresses location BS:0FFF2 and disarmed by addressing location BS:OFF4, where "BS" represents the general address of the security system circuit board. The "alarm enable" signal is generated by ANDing line A1 in gate 807 via line 801 with the "alarm control" signal via line 803. When both of these signals are high, the output of gate 807 will be high causing transistor 809 to conduct thus placing a logic 0 on line 811 and setting flip-flop 813. The "Q" output of flip-flop 813 on line 833 goes high thus providing the "alarm enable" signal. The disarm signal is generated by two input AND gate 815 having the "alarm control" signal coupled to one input by line 803 and line A2 coupled to the other by line 805. When both the "alarm control" signal and the signal on line A2 are high, the output of gate 815 will be high causing transistor 817 to conduct placing a logic 0 on line 819 and resetting flip-flop 813. The "alarm enable" signal on line 833 will become a logic 0 and the alarm will become disabled.

In the armed state, the alarm will be triggered when any of the normally open alarm switches 823 are closed either by tilting the computer system or by attempting to loosen the screws which enable access to the interior of the computer hardware. These switches 823 connect one of the inputs of gate 827 to ground via line 825. This causes its output to go low. The low signal on line 829 provides a set to flip-flop 831 which causes the "Q" output of the flip-flop 831 to go high thus providing an "alarm on" signal on line 841. This signal is ANDed with the "alarm enable" signal on line 833 by gate 843. If both signals are high, a high signal appears on line 845 which causes transistor 847 to conduct thus providing power to oscillator 851 via line 849. Oscillator 851 drives a speaker or buzzer 853 to provide an audible warning. Flip-flop 831 is reset by the signal on line 811. The "alarm status" signal on line 839 is provided by buffer amplifier 837 and resistor 835 which is coupled to line 833. This signal is provided to line 561 in FIG. 5. The alarm system is powered by a nine volt battery so that the alarm enable and trigger states are not changed by turning the computer on or off. In addition, this separate source of power provides an audible alert signal even when the computer is in the off state.

While a particular embodiment of the present invention has been disclosed herein, certain changes and modifications will readily occur for those skilled in the art. For example, a voice imprinter, electronic thumb print scanner or optical bar code scanner can be substituted for the magnetic card reader used the non-keyboard entry device which identifies the user. All such changes and modifications can be made without departing from the invention as defined by the appended claims.

We claim:

1. A security device for a computer system having a keyboard entry device and a floppy disc drive, comprising:
   (a) means for transferring control of said computer system to a security system interposed between an operating system and all peripheral devices and application programs and data stored in said computer system;
   (b) means under control of said security system for changing the computer system's keyboard address to an address in the security system;
   (c) means under control of said security system for changing the computer system's floppy disc drive address to an address in the security system;
   (d) means at said address in said security system for said floppy disc drive for blocking any input to the computer system from said floppy disc drive which would place the operation of the computer system outside the control of said security system;
   (e) means at said address in said security system for blocking any keyboard input to the computer system which would place the operation of the computer system outside the control of said security system;

(f) identifying means for identifying all operators of said computer system;

(g) means for validating the operator's identification;

(h) means responsive to validation by said validation means for restoring the address for said keyboard to said computer system's keyboard address;

(i) means responsive to validation by said validation means for restoring the address for said floppy disc drive to said computer system's floppy disc drive address; and (j) means for allowing said validated operator access to only one or more of said programs and data and operating system for which said validated operator has been pre-authorized.

2. The security device according to claim 1, wherein said system includes a display, and wherein said means for allowing includes means for displaying on said display a menu of programs and functions which the user is authorized to use.

3. The security device according to claim 1, wherein said means for transferring includes a read only memory (ROM) read by said operating system and which contains instructions transferring control of the computer system to the security program.

4. The security device according to claim 3, further comprising:
means under control of said security system for changing the computer system's address for DOS function call routines to an address in the security system; and
means at said address in said security system for said DOS function call routines for blocking execution of DOS commands unless said validated operator is pre-authorized for said operating system.

5. The security device according to claim 3, further comprising:
means under control of said security system for changing the computer system's address for the critical error routine to an address in the security system; and
means at said address in said security system for said critical errors for blocking access to the operating system.

6. The security device of claim 1, further comprising a non-keyboard data entry device, and wherein said means for identifying all operators of said computer system comprises means for identifying all operators of said computer system via said non-keyboard device.

7. The security device according to claim 6, wherein said non-keyboard data entry device is a magnetic card reader.

8. A method for securing a computer system having a keyboard entry device and a floppy disc drive, comprising the steps of:
(a) transferring control of said computer system to a security system interposed between an operating system and all peripheral devices and application programs and data stored in said computer system, said security system performing the following steps:
(b) changing the computer system's keyboard address to an address in the security system;
(c) providing at said security system address a routine for blocking any keyboard input which would place the operation of the computer outside the control of said security system;
(d) changing the computer systems address for said floppy disc drive to an address in the security system;
(e) providing at said security system address for said floppy disc drive a routine for blocking any input from said floppy disc drive which would place the computer outside the control of said security system; and
(f) requiring all operators to identify themselves;
(g) validating the operator's identification;
(h) in response to validation, restoring the address for said keyboard to said computer system's keyboard address;
(i) in response to validation, restoring the address for said floppy disc drive to said computer system's address for said floppy disc drive; and
(j) allowing a valid user access only to one or more of said programs and data and operating system for which the user has been pre-authorized.

9. The method according to claim 8, wherein said system includes a display, and wherein said step (j) includes displaying on said display a menu of programs and functions for which the user is pre-authorized.

10. The method according to claim 9, further comprising the following steps prior to step (a):
initiating operation of said computer system via the operating system's startup routine; and
reading a read only memory (ROM) containing instructions for the operating system to transfer control to said security system.

11. The method according to claim 10, and further comprising:
changing the computer system's address for the critical error routine to an address in the security system; and
providing at said security system address for said critical errors a routine for blocking access to said operating system.

12. The method according to claim 10, and further comprising:
changing the computer system's address for DOS function call routines to an address in the security system; and
providing at said security system address for said DOS function call routines a routine for blocking access to said operating system unless said valid user is pre-authorized for said operating system.

13. The method of claim 8, wherein said computer system further comprises a non-keyboard entry device, and wherein said step (f) comprises requiring all operators to identify themselves via said non-keyboard device.

14. The method according to claim 13, wherein said non-keyboard data entry device reads a magnetically encoded card in step (f).

15. A security device for a computer system having a keyboard entry device, comprising:
(a) means for transferring control of said computer system to a security system interposed between an operating system and all peripheral devices and application programs and data stored in said computer system;
(b) means under control of said security system for changing the computer system's keyboard address to an address in the security system;

(c) means at said address in said security system for blocking any keyboard input to the computer system which would place the operation of the computer system outside the control of said security system;

(d) identifying means for identifying all operators of said computer system;

(e) means for validating the operator's identification;

(f) means responsive to validation by said validation means for restoring the address for said keyboard to said computer system's keyboard address;

(g) means for allowing said validated operator access to only one or more of said programs and data and operating system for which said validated operator has been pre-authorized;

(h) means under control of said security system for changing the computer system's address for the critical error routine to an address in the security system; and (i) means at said address in said security system for said critical errors for blocking access to the operating system.

16. The security device according to claim 15, wherein said system includes a display, and wherein said means for allowing includes means for displaying on said display a menu of programs and functions which the user is authorized to use.

17. The security device according to claim 15, wherein said means for transferring includes a read only memory (ROM) read by said operating system and which contains instructions transferring control of the computer system to the security program.

18. The security device according to claim 17, further comprising:

means under control of said security system for changing the computer system's address for DOS function call routines to an address in the security system; and means at said address in said security system for said DOS function call routines for blocking execution of DOS commands unless said validated operator is pre-authorized for said operating system.

19. The security device of claim 15, further comprising a non-keyboard data entry device, and wherein said means for identifying all operators of said computer system comprises means for identifying all operators of said computer system via said non-keyboard device.

20. The security device according to claim 19, wherein said non-keyboard data entry device is a magnetic card reader.

21. A method for securing a computer system having a keyboard entry device, comprising the steps of:

(a) transferring control of said computer system to a security system interposed between an operating system and all peripheral devices and application progress and data stored in said computer system, said security system performing the following steps:

(b) changing the computer system's keyboard address to an address in the security system;

(c) providing at said security system address a routine for blocking any keyboard input which would place the operation of the computer outside the control of said security system;

(d) requiring all operators to identify themselves;

(e) validating the operator's identification;

(f) in response to validation, restoring the address for said keyboard to said computer system's keyboard address;

(g) allowing a valid user access only to one or more of said programs and data and operating system for which the user has been pre-authorized;

(h) changing the computer system's address for the critical error routine to an address in the security system; and (i) providing at said security system address for said critical errors a routine for blocking access to said operating system.

22. The method according to claim 21, wherein said computer system includes a floppy disc drive, and wherein said security system further performs steps of:

changing the computer systems address for said floppy disc drive to an address in the security system;

providing at said security system address for said floppy disc drive a routine for blocking any input from said floppy disc drive which would place the computer outside the control of said security system; and in response to validation, restoring the address for said floppy disc drive to said computer system's address for said floppy disc drive.

23. The method according to claim 21, wherein said system includes a display, and wherein said step (g) includes displaying on said display a menu of programs and functions for which the user is pre-authorized.

24. The method according to claim 21, further comprising the following steps prior to step (a):

initiating operation of said computer system via the operating system's startup routine; and reading a read only memory (ROM) containing instructions for the operating system to transfer control to said security system.

25. The method according to claim 21, and further comprising:

changing the computer system's address for DOS function call routines to an address in the security system; and providing at said security system address for said DOS function call routines a routine for blocking access to said operating system unless said valid user is pre-authorized for said operating system.

26. The method of claim 21, wherein said computer system further comprises a non-keyboard entry device, wherein said step (d) comprises requiring all operators to identify themselves via said non-keyboard device.

27. The method according to claim 26, wherein said non-keyboard data entry device reads a magnetically encoded card in step (d).

* * * * *